United States Patent
Smith et al.

(10) Patent No.: US 6,227,781 B1
(45) Date of Patent: May 8, 2001

(54) CARGO BRACING ASSEMBLY

(76) Inventors: Lyle R. Smith; Bertha A. Smith, both of 5949 Elmer Derr Rd., Frederick, MD (US) 21703

( * ) Notice: Subject to any disclaimer, the term of this patent is extended or adjusted under 35 U.S.C. 154(b) by 0 days.

(21) Appl. No.: 09/607,463

(22) Filed: Jun. 30, 2000

(51) Int. Cl.⁷ .................................................. B60P 7/15
(52) U.S. Cl. ................................ 410/151; 410/149
(58) Field of Search ................................ 410/143, 151, 410/145, 149; 211/105.5, 105.6; 248/354.1

(56) References Cited

U.S. PATENT DOCUMENTS

| | | | |
|---|---|---|---|
| 3,090,600 | * 5/1963 | Smith | 410/151 |
| 4,023,819 | * 5/1977 | Holman, Jr. | 410/151 |
| 4,332,515 | * 6/1982 | Twyman | 410/149 |
| 4,343,578 | * 8/1982 | Barnes | 410/151 |
| 4,824,302 | * 4/1989 | Schultheis et al. | 410/151 |
| 4,834,599 | * 5/1989 | Gordon et al. | 410/151 |
| 5,427,486 | * 6/1995 | Green | 410/151 X |
| 5,688,087 | * 11/1997 | Stapleton et al. | 410/149 X |
| 5,769,580 | * 6/1998 | Purvis | 410/151 |
| 5,785,475 | * 7/1998 | Winstel et al. | 410/145 X |
| 6,039,521 | * 3/2000 | Sullivan | 410/149 X |

FOREIGN PATENT DOCUMENTS

2191800 * 12/1987 (GB) .

* cited by examiner

*Primary Examiner*—Stephen T. Gordon

(57) ABSTRACT

A cargo bracing assembly for securing cargo in a truck bed. The cargo bracing assembly includes an housing with an open end and a closed end, a tension arm slidably insertable into the open end of the housing to form a brace, and a biasing assembly.

20 Claims, 2 Drawing Sheets

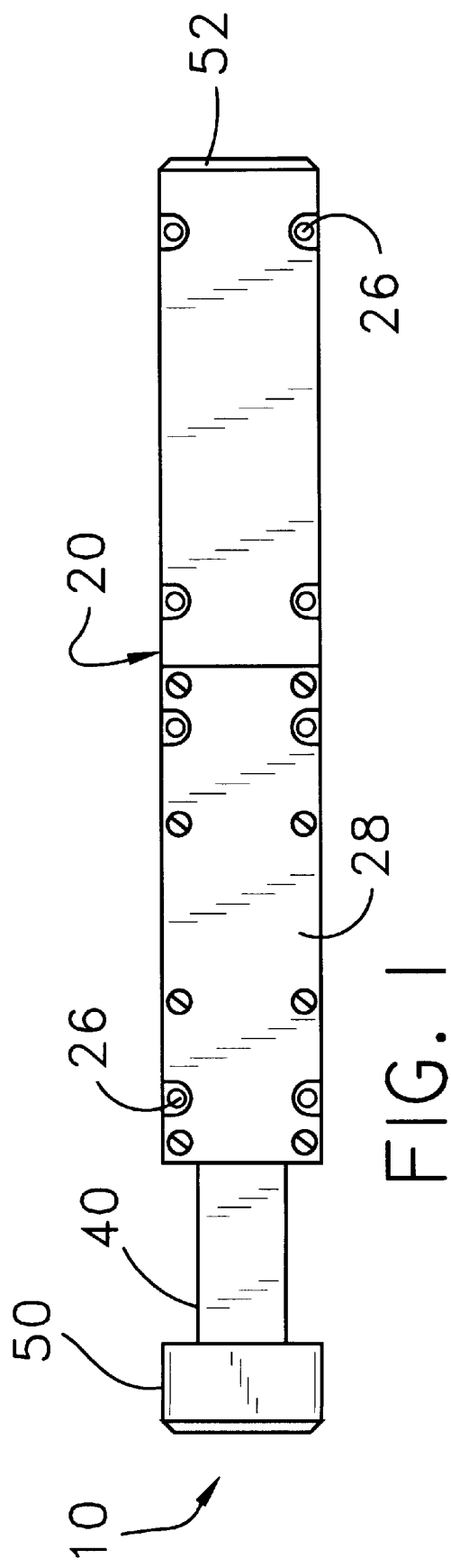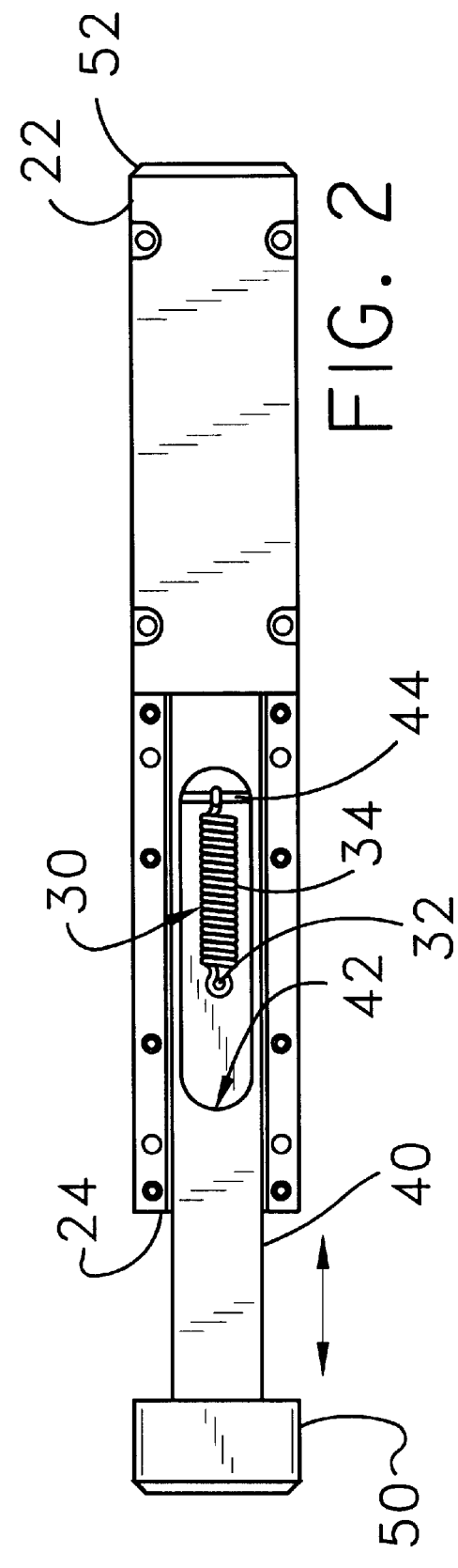

CARGO BRACING ASSEMBLY

BACKGROUND OF THE INVENTION

1. Field of the Invention

The present invention relates to cargo restraining devices and more particularly pertains to a new cargo bracing assembly for securing cargo in a truck bed.

2. Description of the Prior Art

The use of cargo restraining devices is known in the prior art. More specifically, cargo restraining devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,023,819; U.S. Pat. No. 5,281,063; U.S. Pat. No. 4,720,222; U.S. Pat. No. 4,332,515; U.S. Pat. No. 4,473,331; and U.S. Pat. No. Des. 394,640.

While these devices fulfill their respective, particular objectives and requirements, the aforementioned patents do not disclose a new cargo bracing assembly. The inventive device includes a housing with an open end and a closed end, a tension arm slidably insertable into the open end of the housing to form a brace, and a biasing assembly.

In these respects, the cargo bracing assembly according to the present invention substantially departs from the conventional concepts and designs of the prior art, and in so doing provides an apparatus primarily developed for the purpose of securing cargo in a truck bed.

SUMMARY OF THE INVENTION

In view of the foregoing disadvantages inherent in the known types of cargo restraining devices now present in the prior art, the present invention provides a new cargo bracing assembly construction wherein the same can be utilized for securing cargo in a truck bed.

The general purpose of the present invention, which will be described subsequently in greater detail, is to provide a new cargo bracing assembly apparatus and method which has many of the advantages of the cargo restraining devices mentioned heretofore and many novel features that result in a new cargo bracing assembly which is not anticipated, rendered obvious, suggested, or even implied by any of the prior art cargo restraining devices, either alone or in any combination thereof.

To attain this, the present invention generally comprises an housing with an open end and a closed end, a tension arm slidably insertable into the open end of the housing to form a brace, and a biasing assembly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new cargo bracing assembly apparatus and method which has many of the advantages of the cargo restraining devices mentioned heretofore and many novel features that result in a new cargo bracing assembly which is not anticipated, rendered obvious, suggested, or even implied by any of the prior art cargo restraining devices, either alone or in any combination thereof.

It is another object of the present invention to provide a new cargo bracing assembly which may be easily and efficiently manufactured and marketed.

It is a further object of the present invention to provide a new cargo bracing assembly which is of a durable and reliable construction.

An even further object of the present invention is to provide a new cargo bracing assembly which is susceptible of a low cost of manufacture with regard to both materials and labor, and which accordingly is then susceptible of low prices of sale to the consuming public, thereby making such cargo bracing assembly economically available to the buying public.

Still yet another object of the present invention is to provide a new cargo bracing assembly which provides in the apparatuses and methods of the prior art some of the advantages thereof, while simultaneously overcoming some of the disadvantages normally associated therewith.

Still another object of the present invention is to provide a new cargo bracing assembly for securing cargo in a truck bed.

Yet another object of the present invention is to provide a new cargo bracing assembly which includes an housing with an open end and a closed end, a tension arm slidably insertable into the open end of the housing to form a brace, and a biasing assembly.

Still yet another object of the present invention is to provide a new cargo bracing assembly that is easily transferable between different trucks.

Even still another object of the present invention is to provide a new cargo bracing assembly that allows cargo to be secured and tied down without any permanent modification or additions to a truck such as eyebolts.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic top view of a new cargo bracing assembly according to the present invention.

FIG. 2 is a schematic detail view of the biasing assembly of the present invention.

DESCRIPTION OF THE PREFERRED EMBODIMENT

Figure 3:
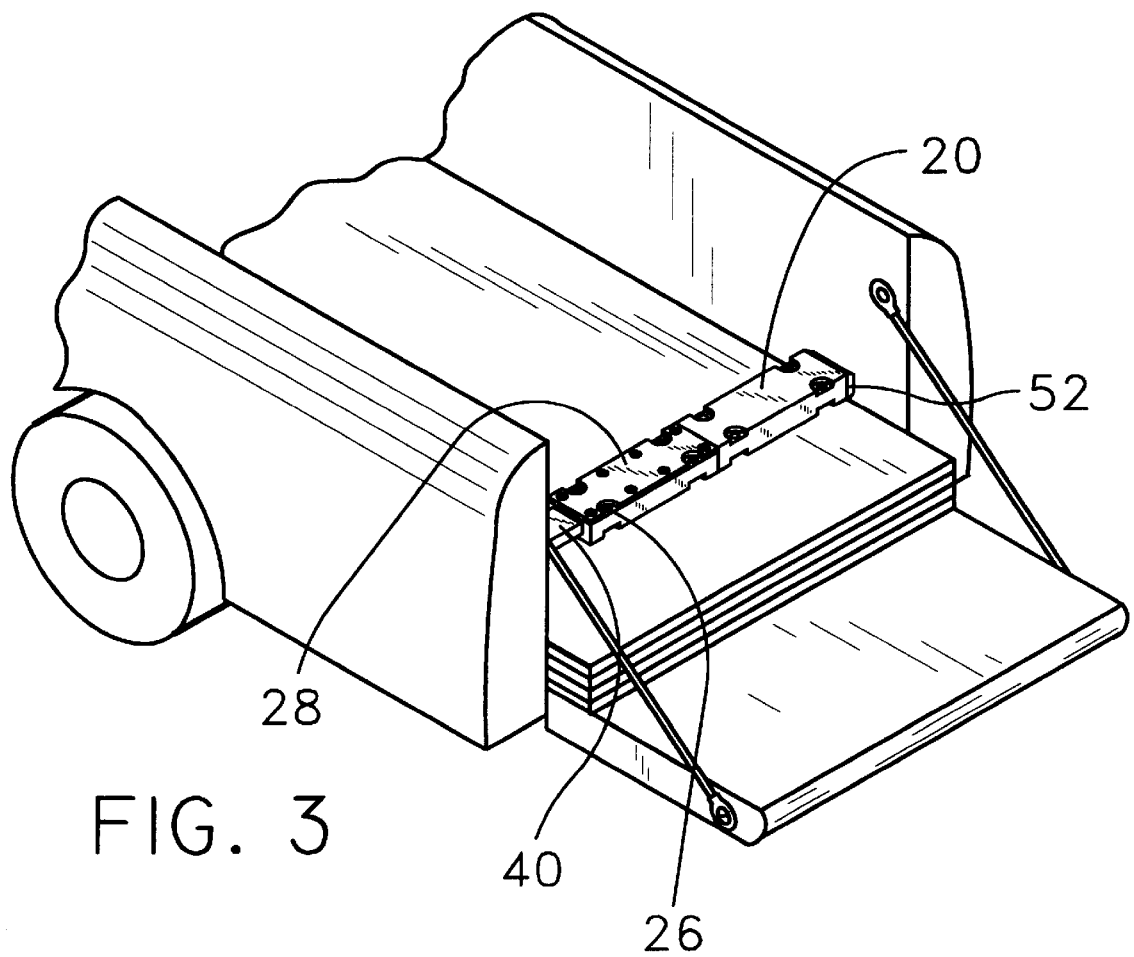
FIG. 3 is a schematic perspective view of the present invention.

With reference now to the drawings, and in particular to FIGS. 1 through 3 thereof, a new cargo bracing assembly embodying the principles and concepts of the present invention and generally designated by the reference numeral 10 will be described.

As best illustrated in FIGS. 1 through 3, the cargo bracing assembly 10 generally comprises an housing 20, a tension arm 40, a biasing assembly 30, and a pair of end cover members 50, 52.

The housing 20 includes a closed end 22 and an open end 24. The open end 24 extends into the housing 20.

The tension arm 40 is slidably insertable into the open end 24 of the housing 20.

The biasing assembly 30 is used for biasing a distal end of the tension arm 40 outwardly from the open end 24. Thus the brace 10 is positionable to extend between opposite sides of a cargo bed of a vehicle.

The first one 50 of the end cover members is coupled to the distal end of the tension arm 40. The second one 52 of the end cover members is coupled to the closed end 22 of the housing 20.

Each of the end cover members 50, 52 is rubber. Thus each end cover 50, 52 is designed for enhancing frictional contact between each end cover 50, 52 and an associated one of the opposite sides of the cargo bed for holding the brace 10 in a static position relative to the cargo bed. Thus the brace 10 is designed for positioning to abut cargo in the cargo bed for holding the cargo in a static position relative to the cargo bed during use of the vehicle.

Each the end cover member 50, 52 includes an angled perimeter portion such that a distal end of each the end cover member 50, 52 is tapered for facilitating positioning of the brace 10.

The housing 20 includes a plurality of tie down apertures 26 which extend through the housing 20. Thus the housing 20 is designed for coupling to a tie-down strap for facilitating stabilization of cargo in the cargo bed.

The plurality of tie down apertures 26 includes a first set of apertures positioned in spaced relationship proximate a longitudinal side of the housing 20. A longitudinal axis of each tie down aperture of the first set of apertures is positioned in an associated plane perpendicular to a longitudinal axis of the housing 20.

The plurality of tie down apertures 26 includes a second set of apertures positioned in spaced relationship proximate a second longitudinal side of the housing 20. A longitudinal axis of each tie down aperture of the second set of apertures is positioned in an associated plane perpendicular to the longitudinal axis of the housing 20.

Each of the tie down apertures of the first set of apertures is aligned with an associated one of the tie down apertures of the second set of apertures. Thus the longitudinal axis of the tie down aperture of the first set of apertures is coplanar with the longitudinal axis of the associated tie down aperture of the second set of apertures.

Each tie down aperture 26 extends between an associated top recess and an associated bottom recess in the housing 20. Each of the top recesses and each of the bottom recesses extend inwardly from an associated longitudinal side of the housing 20. Thus the housing 20 is designed for facilitating insertion of a connection member through each of the tie down apertures 26.

In an embodiment the biasing assembly 30 includes a tension arm 40, a housing pin 32 and a biasing member 34. The tension arm 40 includes a longitudinal slot 42 and a tension arm pin 44 positioned in the longitudinal slot 42. The housing pin 32 extends generally transversely through the open end of the housing 20 and through the longitudinal slot of the tension arm 40. The biasing member 34 is coupled to extend between the tension arm pin 44 and the housing pin 32 for biasing the tension arm pin 44 and the housing pin 32 towards each other. Thus the tension arm 40 is biased outwardly from the open end 24 of the housing 20.

The housing 20 includes a cover member 28 for facilitating access to an interior portion of the open end 24 of the housing 20. The housing 20 has a generally rectangular cross-section.

In use, the user would place the cargo to be transported in the truck bed. The user would then position the cargo bracing assembly adjacent to the cargo to be secured. One end of the cargo bracing assembly would be placed in position by the user. The user would then compress the cargo bracing assembly by applying force to the second end directed towards the first end. The user would then position the second end of the cargo bracing assembly and release the force being applied. With the release of the applied force, the cargo bracing assembly would extend under the force of the internal spring, until the second end came into forcible contact with the second wall of the truck bed.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A cargo bracing assembly comprising:
a housing having a closed end and an open end, said open end extending into said housing;
a tension arm slidably insertable into said open end of said housing to form a brace;
a biasing assembly for biasing a distal end of said tension arm outwardly from said open end whereby said brace is positionable to extend between opposite sides of a cargo bed of a vehicle; and
wherein said biasing assembly further comprises:
said tension arm having a longitudinal slot and a tension arm pin positioned in said longitudinal slot;
a housing pin extending generally transversely through said open end of said housing and through said longitudinal slot of said tension arm; and
a biasing member coupled to extend between said tension arm pin and said housing pin for biasing said tension arm pin and said housing pin towards each other whereby said tension arm is biased outwardly from said open end of said housing.

2. The cargo bracing assembly of claim 1, further comprising:
a pair of end cover members, a first one of said end cover members being coupled to said distal end of said tension arm, a second one of said end cover members being coupled to said closed end of said housing.

3. The cargo bracing assembly of claim 2, further comprising:
each of said end cover members being rubber whereby each end cover is adapted for enhancing frictional contact between each end cover and an associated one of the opposite sides of the cargo bed for holding said brace in a static position relative to the cargo bed whereby said brace is adapted for positioning to abut cargo in said cargo bed for holding the cargo in a static position relative to the cargo bed during use of the vehicle.

4. The cargo bracing assembly of claim 2, further comprising:
each said end cover member having an angled perimeter portion such that a distal end of each said end cover member is tapered for facilitating positioning of said brace.

5. The cargo bracing assembly of claim 1, further comprising:
said housing having a plurality of tie down apertures extending through said housing whereby said housing is adapted for coupling to a tie-down strap for facilitating stabilization of cargo in the cargo bed.

6. The cargo bracing assembly of claim 5, further comprising:
said plurality of tie down apertures including a first set of apertures positioned in spaced relationship proximate a longitudinal side of said housing, a longitudinal axis of each tie down aperture of said first set of apertures being positioned in an associated plane parallel to a longitudinal axis of said housing.

7. The cargo bracing assembly of claim 6, further comprising:
said plurality of tie down apertures including a second set of apertures positioned in spaced relationship proximate a second longitudinal side of said housing, a longitudinal axis of each tie down aperture of said second set of apertures being positioned in an associated plane parallel to said longitudinal axis of said housing.

8. The cargo bracing assembly of claim 7, further comprising:
each of said tie down apertures of said first set of apertures being aligned with an associated one of said tie down apertures of said second set of apertures whereby said longitudinal axis of said tie down aperture of said first set of apertures is coplanar with said longitudinal axis of said associated tie down aperture of said second set of apertures.

9. The cargo bracing assembly of claim 6, further comprising:
each tie down aperture extending between an associated top recess and an associated bottom recess in said housing, each said top recess and each said bottom recess extending inwardly from an associated longitudinal side of said housing whereby said housing is adapted for facilitating insertion of a connection member through each said tie down aperture.

10. A cargo bracing assembly comprising:
a housing having a closed end and an open end, said open end extending into said housing;
a tension arm slidably insertable into said open end of said housing to form a brace;
a biasing assembly for biasing a distal end of said tension arm outwardly from said open end whereby said brace is positionable to extend between opposite sides of a cargo bed of a vehicle;
a pair of end cover members, a first one of said end cover members being coupled to said distal end of said tension arm, a second one of said end cover members being coupled to said closed end of said housing;
each of said end cover members being rubber whereby each end cover is adapted for enhancing frictional contact between each end cover and an associated one of the opposite sides of the cargo bed for holding said brace in a static position relative to the cargo bed whereby said brace is adapted for positioning to abut cargo in said cargo bed for holding the cargo in a static position relative to the cargo bed during use of the vehicle;
each said end cover member having an angled perimeter portion such that a distal end of each said end cover member is tapered for facilitating positioning of said brace;
said housing having a plurality of tie down apertures extending through said housing whereby said housing is adapted for coupling to a tie-down strap for facilitating stabilization of cargo in the cargo bed;
said plurality of tie down apertures including a first set of apertures positioned in spaced relationship proximate a longitudinal side of said housing, a longitudinal axis of each tie down aperture of said first set of apertures being positioned in an associated plane parallel to a longitudinal axis of said housing;
said plurality of tie down apertures including a second set of apertures positioned in spaced relationship proximate a second longitudinal side of said housing, a longitudinal axis of each tie down aperture of said second set of apertures being positioned in an associated plane parallel to said longitudinal axis of said housing;
each of said tie down apertures of said first set of apertures being aligned with an associated one of said tie down apertures of said second set of apertures whereby said longitudinal axis of said tie down aperture of said first set of apertures is coplanar with said longitudinal axis of said associated tie down aperture of said second set of apertures;

each tie down aperture extending between an associated top recess and an associated bottom recess in said housing, each said top recess and each said bottom recess extending inwardly from an associated longitudinal side of said housing whereby said housing is adapted for facilitating insertion of a connection member through each said tie down aperture;

wherein said biasing assembly includes
- said tension arm having a longitudinal slot and a tension arm pin positioned in said longitudinal slot,
- a housing pin extending generally transversely through said open end of said housing and through said longitudinal slot of said tension arm, and
- a biasing member coupled to extend between said tension arm pin and said housing pin for biasing said tension arm pin and said housing pin towards each other whereby said tension arm is biased outwardly from said open end of said housing;

said housing including a cover member for facilitating access to an interior portion of said open end of said housing; and said housing having a generally rectangular cross-section.

11. The cargo bracing assembly of claim 1, further comprising:

said housing including a cover member for facilitating access to an interior portion of said open end of said housing.

12. The cargo bracing assembly of claim 1, further comprising:

said housing having a generally rectangular cross-section.

13. A cargo bracing assembly comprising:

a housing having a closed end and an open end, said open end extending into said housing;

a tension arm slidably insertable into said open end of said housing to form a brace;

a biasing assembly for biasing a distal end of said tension arm outwardly from said open end whereby said brace is positionable to extend between opposite sides of a cargo bed of a vehicle;

said housing having a plurality of tie down apertures extending through said housing whereby said housing is adapted for coupling to a tie-down strap for facilitating stabilization of cargo in the cargo bed;

said plurality of tie down apertures including a first set of apertures positioned in spaced relationship proximate a longitudinal side of said housing, a longitudinal axis of each tie down aperture of said first set of apertures being positioned in an associated plane parallel to a longitudinal axis of said housing; and each tie down aperture extending between an associated top recess and an associated bottom recess in said housing, each said top recess and each said bottom recess extending inwardly from an associated longitudinal side of said housing whereby said housing is adapted for facilitating insertion of a connection member through each said tie down aperture.

14. The cargo bracing assembly of claim 13, further comprising:

said housing having a generally rectangular cross-section.

15. The cargo bracing assembly of claim 13, further comprising:

a pair of end cover members, a first one of said end cover members being coupled to said distal end of said tension arm, a second one of said end cover members being coupled to said closed end of said housing.

16. The cargo bracing assembly of claim 15, further comprising:

each of said end cover members being rubber whereby each end cover is adapted for enhancing frictional contact between each end cover and an associated one of the opposite sides of the cargo bed for holding said brace in a static position relative to the cargo bed whereby said brace is adapted for positioning to abut cargo in said cargo bed for holding the cargo in a static position relative to the cargo bed during use of the vehicle.

17. The cargo bracing assembly of claim 15, further comprising:

each said end cover member having an angled perimeter portion such that a distal end of each said end cover member is tapered for facilitating positioning of said brace.

18. The cargo bracing assembly of claim 13, further comprising:

said plurality of tie down apertures including a second set of apertures positioned in spaced relationship proximate a second longitudinal side of said housing, a longitudinal axis of each tie down aperture of said second set of apertures being positioned in an associated plane parallel to said longitudinal axis of said housing.

19. The cargo bracing assembly of claim 18, further comprising:

each of said tie down apertures of said first set of apertures being aligned with an associated one of said tie down apertures of said second set of apertures whereby said longitudinal axis of said tie down aperture of said first set of apertures is coplanar with said longitudinal axis of said associated tie down aperture of said second set of apertures.

20. The cargo bracing assembly of claim 13, further comprising:

said housing including a cover member for facilitating access to an interior portion of said open end of said housing.

* * * * *